United States Patent
Michalakos et al.

(10) Patent No.: US 7,389,639 B2
(45) Date of Patent: Jun. 24, 2008

(54) WATER RECOVERY AND PURIFICATION

(75) Inventors: Peter M. Michalakos, Chicago, IL (US);
Mark B. Koch, Mount Prospect, IL (US); Russ Johnson, Elmhurst, IL (US);
Francis S. Lupton, Evanston, IL (US)

(73) Assignee: Honeywell International Inc., Morristown, NJ (US)

( * ) Notice: Subject to any disclaimer, the term of this patent is extended or adjusted under 35 U.S.C. 154(b) by 639 days.

(21) Appl. No.: 10/870,569

(22) Filed: Jun. 16, 2004

(65) Prior Publication Data

US 2004/0258597 A1   Dec. 23, 2004

Related U.S. Application Data

(60) Provisional application No. 60/480,556, filed on Jun. 20, 2003.

(51) Int. Cl.
*F01N 3/02* (2006.01)
(52) U.S. Cl. .................. 60/309; 60/274; 60/297; 210/669; 210/694; 210/900
(58) Field of Classification Search .......... 60/274, 60/297, 309; 210/669, 681–688, 694, 900; 95/39, 288
See application file for complete search history.

(56) References Cited

U.S. PATENT DOCUMENTS

| 2,479,766 | A | | 8/1949 | Mulvany |
| 4,656,831 | A | | 4/1987 | Budininkas et al. |
| 4,725,359 | A | | 2/1988 | Ray |
| 5,670,053 | A | * | 9/1997 | Collentro et al. ............ 210/652 |
| 6,001,244 | A | * | 12/1999 | Salter et al. ................. 210/104 |
| 6,537,456 | B2 | * | 3/2003 | Mukhopadhyay ........... 210/652 |
| 6,581,375 | B2 | | 6/2003 | Jagtoyen et al. |
| 7,000,409 | B2 | * | 2/2006 | Mazzetti ....................... 62/93 |
| 2003/0188850 | A1 | | 10/2003 | Liu et al. |
| 2006/0091048 | A1 | * | 5/2006 | Healey ....................... 210/110 |
| 2006/0226081 | A1 | * | 10/2006 | Lupton et al. ............... 210/652 |

* cited by examiner

*Primary Examiner*—Tu M. Nguyen
(74) *Attorney, Agent, or Firm*—Oral Caglar, Esq.

(57) ABSTRACT

A system for recovering and purifying water from a gas stream may include, a gas stream purification unit for purifying the gas stream, a water separation unit for separating water from the purified gas stream, and a water purification unit for purifying the water separated by the water separation unit. The gas stream purification unit may include comprise a soot reactor and a catalytic oxidation reactor or both. The water separation unit may include a condenser, a water extractor and a cyclic reverse osmosis system.

38 Claims, 6 Drawing Sheets

WATER RECOVERY AND PURIFICATION

CROSS-REFERENCE TO RELATED APPLICATIONS

This application claims the benefit of U.S. Provisional Patent Application No. 60/480,556, filed on Jun. 20, 2003.

BACKGROUND OF THE INVENTION

The present invention generally relates to water recovery and purification apparatus and methods for providing potable water from a gas.

Ambient air may provide a convenient source of potable water in certain environments. Exhaust gas from an internal combustion engine may comprise about 10% by volume of water, and may provide a relatively large supply of water. Engine exhaust from vehicles may provide a mobile supply of water from an existing source. The recovery of potable water from air or engine exhaust is of advantage in remote areas, which lack reliable supplies of clean water, and to the military.

While engine exhaust contains higher concentrations of water as compared with ambient air, exhaust gas also contains various pollutants which must be removed to provide relatively pure, potable water. However, current systems for water recovery are inefficient; that is, the energy cost or weight and size of the system is high, while the quality of the recovered water is relatively poor. One problem encountered in recovering water from engine exhaust is that the exhaust gas typically contains many types of impurities that are not removed by a single device. For example, engine exhaust may include organic particulates (soot); organic vapors, such as fuel and partially combusted fuel; metals from the engine; and inorganic compounds, such as nitrogen oxides formed from nitrogen in air, and sulfur oxides formed from sulfur in fuel. Engine exhaust may further include compounds ingested into the engine from the environment, including compounds found on a battlefield such as smoke and chemical warfare agents.

Prior art devices for water recovery and purification from gases require frequent maintenance or have low efficiency when used for recovering potable water from engine exhaust streams. For example, membranes and filters for removing particulates clog frequently due to the accumulation of soot, and furthermore generally do not remove low molecular weight organic compounds. Adsorptive filters for removing organic compounds have finite capacity and need to be replaced as consumable items.

U.S. Pat. No. 2,479,766 to Mulvany discloses a water recovery system for recovering water from engine exhaust during aircraft flight, in which water is separated by a water separator, and cooling for condensation is provided by slipstream air. U.S. Pat. No. 4,725,359 to Ray discloses a water recovery apparatus for recovering water from engine exhaust in which a membrane is used to separate water, in the form of a water vapor permeate stream, from the exhaust gas.

U.S. Pat. No. 4,656,831 to Budininkas et al. discloses a water recovery apparatus for recovering water from engine exhaust in which water is separated from the exhaust via a condenser, and the water is passed through an ion exchanger on a limestone bed. U.S. Pat. No. 6,581,375 to Jagtoyen et al. discloses a water recovery apparatus for recovering water from the exhaust of a vehicle in which the vehicle's catalytic converter is used to remove pollutants from the vehicle exhaust, and water condensed from the exhaust is filtered through particulate filters, passed through activated carbon beds, and passed through ion exchange resin beds. Both Budininkas et al. and Jagtoyen et al. require the exhaust temperature to be preferably at least about 700° F. for operation of the apparatus, due to the temperature requirements of the catalytic converter.

As can be seen, there is a need for a water recovery system and method for water recovery and purification from a gas stream that is broadly applicable to both non-vehicle applications and vehicle applications, including aircraft and land vehicles, whether stationary or moving, and to gas turbine engines, diesel engines, and gasoline engines. There is a further need for a water recovery system and method that is energy efficient, is not restricted by operational conditions, uses minimal amounts of consumable materials and components, and requires minimal maintenance. There is a further need for a water recovery system that can be operated regardless of engine- or exhaust gas temperature, and which is applicable to ambient air as well as exhaust gas.

SUMMARY OF THE INVENTION

In one aspect of the present invention, there is provided a system comprising a gas stream purification unit for purifying a gas stream to provide a purified gas stream; a water separation unit for separating condensed water from the purified gas stream to provide a condensate, the water separation unit disposed downstream from the gas stream purification unit; and a water purification unit for purifying the water, wherein the water purification unit comprises a reverse osmosis system.

In another aspect of the present invention, there is provided a system comprising a gas stream purification unit for purifying a gas stream to provide a purified gas stream; a water separation unit for separating water from the purified gas stream, the water separation unit disposed downstream from the gas stream purification unit; and a water purification unit for purifying the water. The gas stream purification unit may comprise a soot reactor for removing particulates from the gas stream, wherein the soot reactor is adapted for oxidizing organic particulates removed from the gas stream to carbon dioxide.

In still another aspect of the present invention, there is provided a system comprising a gas stream purification unit for purifying a gas stream to provide a purified gas stream; a water separation unit for separating water from the purified gas stream; and a water purification unit for purifying the water. The water separation unit may be disposed downstream from the gas stream purification unit, the water separation unit includes a condenser and a cooling unit for providing a cooled fluid to the condenser, and the cooling unit comprises at least one apparatus such as a vapor cycle system, an air cycle system, an ambient air cooling system, a cooling tower system, a sorptive cooling system, and an absorption cooling system.

In yet another aspect of the present invention, there is provided a system comprising a gas stream source for providing a gas stream; a soot reactor for removing particulates from the gas stream and for combusting organic particulates; a catalytic oxidation reactor (CATOX) unit adapted for catalytically oxidizing organic components of the gas stream, the CATOX unit disposed downstream from the soot reactor; a precooler disposed downstream from the soot reactor; a condenser for condensing water in the gas stream; a water extractor for separating the water from the gas stream; and a reverse osmosis system for purifying the water separated by the water extractor.

In an additional aspect of the present invention, a method for providing potable water from a gas comprises providing a gas stream; passing the gas stream through a gas stream purification unit to provide a purified gas stream; passing the purified gas stream into a water separation unit to separate water from the purified gas stream; and purifying the water via a reverse osmosis unit.

In a further aspect of the present invention, a method for providing potable water comprises providing a gas stream comprising exhaust gas from an engine; passing the gas stream through a gas stream purification unit to provide a purified gas stream, wherein the gas stream purification unit comprises a soot reactor adapted for combusting organic particulates trapped by the soot reactor; passing the purified gas stream into a water separation unit to separate water from the purified gas stream; and purifying the water.

In still a further aspect of the present invention, a method for providing potable water comprises providing a gas stream; passing the gas stream through a gas stream purification unit to provide a purified gas stream; passing the purified gas stream into a water separation unit to separate water from the purified gas stream; and purifying the water. The water separation unit comprises a condenser, a cooling unit in communication with the condenser for providing a cooled fluid to the condenser, and a water extractor for separating condensed water from the gas stream. The cooling unit may comprise at least one apparatus such as a vapor cycle system, an air cycle system, an ambient air cooling system, a cooling tower system, a sorptive cooling system, and an absorption cooling system.

In yet a further aspect of the present invention, a method for recovering potable water from a gas stream comprises providing a gas stream; removing particulates from the gas stream via a soot reactor; combusting organic particulates trapped by the soot reactor; cooling the gas stream via passage through a precooler disposed downstream from the soot reactor; condensing water in the gas stream; separating the water from the gas stream via a water extractor; pumping the water to a reverse osmosis unit; and collecting a permeate from the reverse osmosis unit, wherein the permeate comprises potable water.

In an additional aspect of the present invention, method for purifying water comprises passing condensate to a feed reservoir containing feed water, wherein the condensate is obtained from a gas stream; pumping the feed water from the feed reservoir, via a first conduit, to a reverse osmosis unit; separating the feed water into a retentate and a permeate via the reverse osmosis unit; recycling the retentate to the feed reservoir via a second conduit; and collecting the permeate.

In yet another aspect of the present invention, there is provided a system for recovering water from air comprising a filter for filtering an airstream; a condenser for condensing water in the airstream; a cooling unit in thermal communication with the condenser for providing a cooled fluid to the condenser; a water extractor for separating the water condensed in the condenser; and a water purification unit for purifying the water separated by the water extractor.

In still another aspect of the present invention, a method for recovering water from air comprises cooling a condenser via a cooled fluid provided from a cooling unit, wherein the cooling unit comprises a sorptive cooling system; passing an airstream into the condenser, whereby water in the airstream is condensed; extracting the condensed water via a water extractor to provide a condensate; and purifying the condensate by passing the condensate through at least one of a water filter and a reverse osmosis unit.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides systems and methods for water recovery and purification from a gas stream. The gas stream from which water is to be recovered may be, for example, exhaust gas from an internal combustion engine or ambient air. Systems and methods of the present invention may be used for water recovery from engine exhaust in both non-vehicular and vehicular applications. The present invention is also applicable to both aircraft and land vehicles, whether the engine is a gas turbine engine, a diesel engine, or a gasoline engine.

In contrast to prior art apparatus that use a catalytic converter to remove organic carbon, and which therefore require exhaust gas to attain a certain temperature before water recovery is commenced, apparatus of the present invention is not so limited and may be used for water recovery from engine exhaust gas regardless of exhaust gas temperature. According to the present invention, organic particulates may be trapped by a soot reactor regardless of temperature, and the trapped particulates may be subsequently decomposed by combustion when the temperature of the exhaust gas has subsequently increased. Also according to the present invention, any non-particulate material carried over to a condensate, obtained from the exhaust gas, may be removed from the condensate by a reverse osmosis system. In contrast, prior art apparatus for recovering water from engine exhaust do not incorporate a reverse osmosis system for purifying condensed water. Instead, prior art apparatus and processes for recovering water from engine exhaust use consumable filters comprising, for example, asbestos, activated charcoal, and ion exchange resins.

Figure 1A:
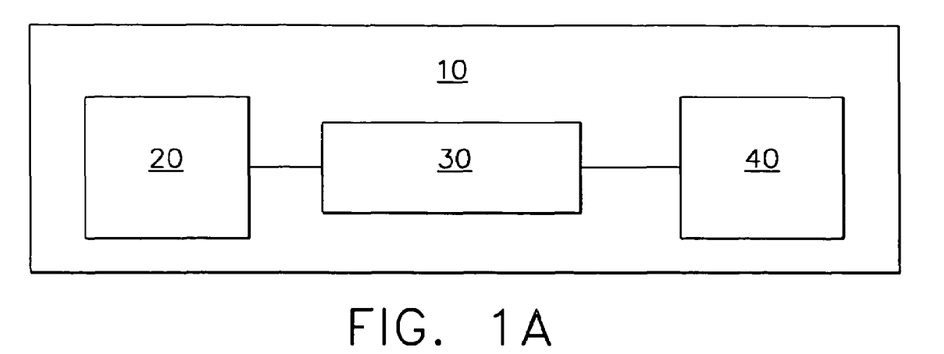
FIG. 1A is a block diagram schematically representing a system for recovering water from a gas stream, according to the invention.

FIG. 1A is a block diagram schematically representing a system 10, including a gas stream source 20, for recovering water from a gas stream 30 provided by gas stream source 20, wherein gas stream 30 may be passed to a water recovery and purification (WRAP) system 40. Gas stream 30 may comprise, as an example, engine exhaust gas (see FIG. 1A), or air (see FIG. 5). Gas stream source 20 may comprise, for example, an internal combustion engine (see FIG. 1A), or an air duct or scoop in fluid communication with a fan and a source of ambient air (see FIG. 5). Various embodiments of WRAP system 40 are described hereinbelow, for example, with reference to FIGS. 3A-C.

Figure 1B:
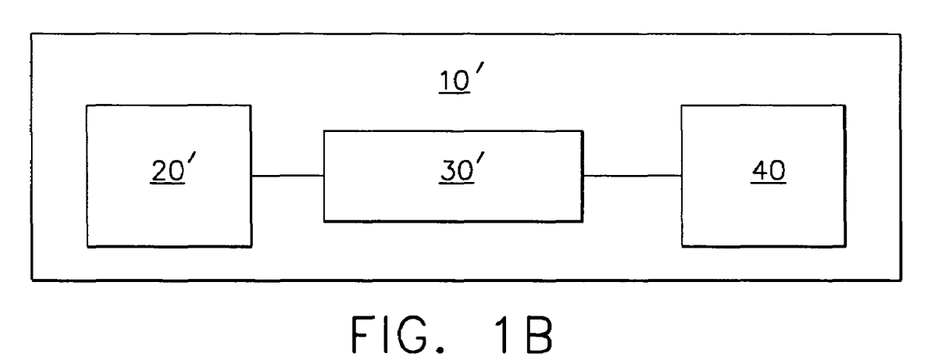
FIG. 1B is a block diagram schematically representing a system for recovering water from engine exhaust gas, according to one embodiment of the invention.

FIG. 1B is a block diagram schematically representing a system 10' for recovering water from engine exhaust gas 30', according to another embodiment of the present invention. Exhaust gas 30' may be provided by engine 20'. Engine 20' may be a gas turbine engine, or a piston driven engine in the form of a diesel engine or a gasoline engine. Engine 20' may be housed within a vehicle, such as a land vehicle or an aircraft. Engine 20' may be a propulsion engine for propelling a vehicle, or may be devoted to auxiliary power generating functions, such as an auxiliary power unit (APU) turbomachine of an aircraft. By way of additional examples, engine 20' may be a turbomachine for electric power generation, or may be a diesel- or gasoline powered engine for a generator.

Again with reference to FIG. 1B, exhaust gas 30' may be passed to WRAP system 40 for recovery and purification of water from exhaust gas 30'. Unlike certain prior art apparatus, operation of WRAP system 40 may commence immediately after start-up of engine 20' and may continue regardless of the temperature of exhaust gas 30' and of engine 20'. Thus, WRAP system 40 may be operated continuously during periods when engine 20' is idle or at low load, as well as during periods of high load. System 10' may include a diverter (not shown) for diverting, under automatic or manual control, a portion of exhaust gas 30' to WRAP system 40. The portion of exhaust gas 30' diverted or passed to WRAP system 40 may range from 0 to about 100%, more usually from about 1 to 50%, and often from about 5 to 20%.

Figure 2:
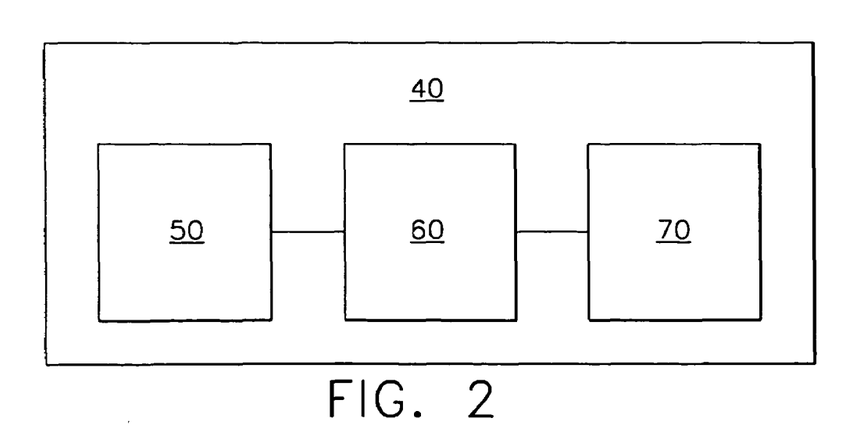
FIG. 2 is a block diagram schematically representing a water recovery and purification system, according to another embodiment of the invention.

FIG. 2 is a block diagram schematically representing a water recovery and purification (WRAP) system 40, according to an embodiment of the present invention. WRAP system 40 may include a gas stream purification unit 50 for purifying gas stream 30 prior to separation of water from gas stream 30. As an example, gas stream 30 may comprise engine exhaust or air, such as ambient air. The composition of gas stream 30, and hence the type and amount of purification to be performed by gas stream purification unit 50, may vary widely depending on the environment and the nature of gas stream 30. For example, where gas stream 30 comprises ambient air, gas stream purification unit 50 may simply comprise a particulate filter, or gas stream purification unit 50 may be omitted. On the other hand, where gas stream 30 comprises diesel engine exhaust, or air from a battlefield environment, gas stream purification unit 50 may comprise a plurality of components which may be arranged, e.g., in series, to sequentially remove various pollutants, including particulates, vapor-phase organics, and vapor-phase inorganics.

Particulates removed by gas stream purification unit 50 may include organic particulates or soot, as well as inorganic particulates such as dust and sand. The term "soot" may be used herein to denote non-volatile, mechanically filterable organic or carbonaceous materials, including droplets of viscous liquid which may be present in engine exhaust gas. Such soot material is typically combustible within the temperature range of engine exhaust gas, typically from about 300 to 1200° F.

Gas stream purification unit 50 may further include one or more components adapted for removing volatile organic materials from gas stream 30, including nerve gases, such as VX gas (O-ethyl-S-(2-iisopropylaminoethyl) methylphosphonothiolate), or derivatives thereof. For example, warfare agents present in the environment may be ingested by an engine, and may be partially converted within the engine to form toxic derivatives of chemical warfare agents, or such warfare agents may pass unaltered through the engine and may be present in gas stream 30. Examples of components of gas stream purification unit 50 may include, without limitation, an electrostatic filter (not shown), a soot reactor 52, a catalytic oxidation reactor (CATOX) unit 54, and first and second adsorbent beds 56a, 56b. Components of gas stream purification unit 50 of the invention are described hereinbelow, e.g., with reference to FIGS. 3A-C.

Again with reference to FIG. 2, WRAP system 40 may further include a water separation unit 60, disposed downstream from gas stream purification unit 50, for separating water from gas stream 30. The water separated from gas stream 30 by water separation unit 60 may be in the form of a condensate. Such a condensate may contain various contaminants, e.g., derived from gas stream 30. For example, in the case of engine exhaust, the condensate may comprise sulfuric acid and nitric acid derived from SOx and NOx, both of which are well-known combustion by-products. Examples of components of water separation unit 60 may include, without limitation, a condenser 62 and a water extractor 64 (see FIGS. 3A-C).

Again with reference to FIG. 2, WRAP system 40 may further include a water purification unit 70, disposed downstream from water separation unit 60, for purifying the water or condensate separated by water separation unit 60. Water purification unit 70 may be adapted for removing contaminants from water separated by water separation unit 60 to provide potable water. Water purification unit 70 may comprise, as an example, at least one of a water filter or a reverse osmosis unit 200 (see, for example, FIG. 6). By incorporating a reverse osmosis unit 200 in WRAP system 40, organic materials co-condensed with water in water separation unit 60 may be removed together with inorganic salts and acids. The overall percentage recovery of potable water from gas stream 30 by WRAP system 40 may be in the range of from about 50 to 75%.

Figure 3A:
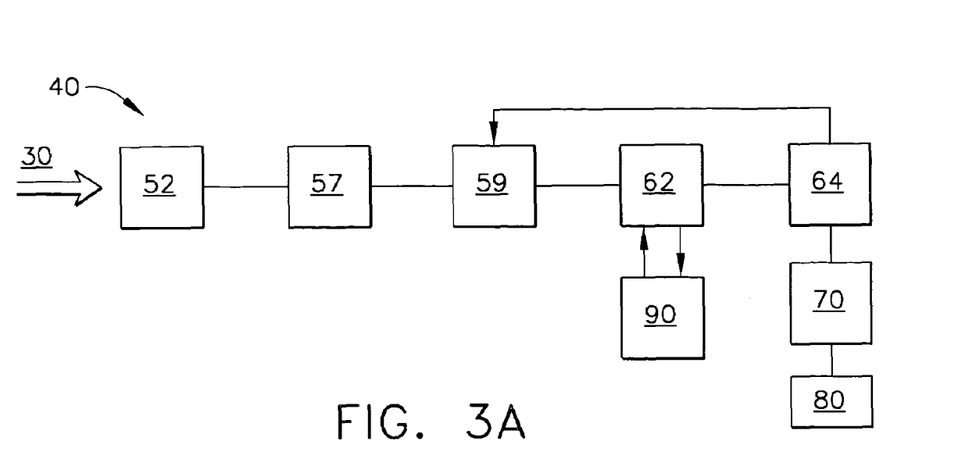
FIGS. 3A-C each schematically represents a water recovery and purification system, according to various embodiments of the invention.
Figure 3B:
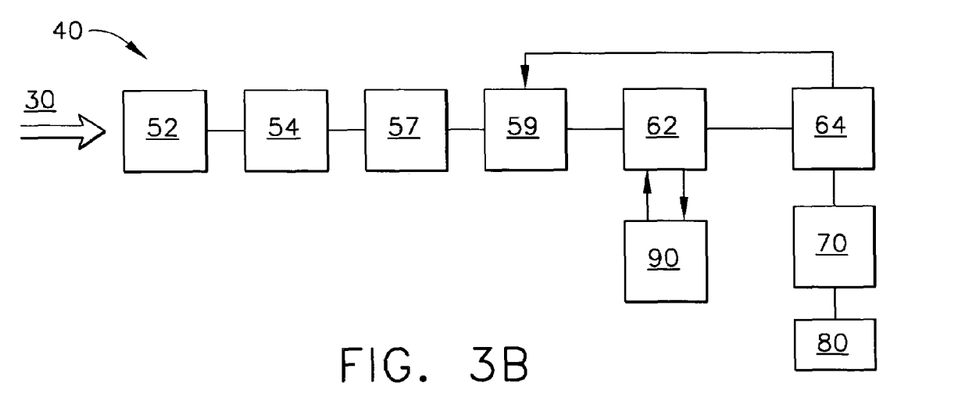
Figure 3C:
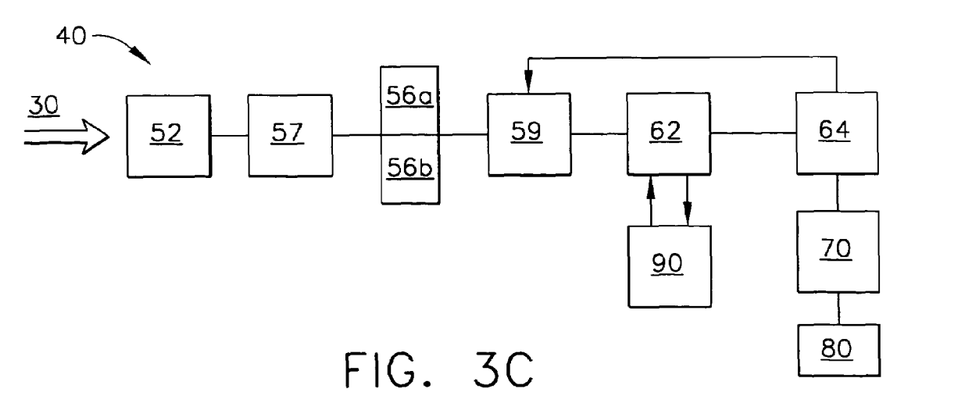

FIGS. 3A-C each schematically represents a water recovery and purification system 40, according to various embodiments of the present invention. With reference to FIG. 3A, WRAP system 40 may include a soot reactor 52 adapted for receiving gas stream 30, which may comprise, for example, engine exhaust. Soot reactor 52 may be adapted for removing, e.g., initially trapping particulates, including soot particles, from gas stream 30. Soot reactor 52 may be adapted for decomposing, e.g., combusting, soot removed from gas stream 30 within a temperature range typical for engine exhaust gas, e.g., from about 300 to 1200° F.

In some embodiments, soot reactor 52 may have a catalyst associated therewith for catalytically promoting oxidation of trapped soot particles. The catalyst associated with soot reactor 52 may comprise, as an example, a noble metal, a transition metal, or a metal oxide on a suitable support such as a refractory oxide layer. Soot reactor 52 may be capable of completely oxidizing at least 85% of all soot particles present in gas stream 30 to carbon dioxide and water without the need for exchanging, servicing, or maintaining the reactor. Thus, soot reactor 52 typically may not represent a consumable item or component of WRAP system 40. Soot reactor 52 may be configured, e.g., sized, to allow loading of soot reactor 52 with soot for a time sufficient to allow the temperature of soot reactor 52 to rise to a level that permits combustion of trapped soot. Accordingly, WRAP system 40 may be operated under any engine condition, regardless of exhaust temperature.

In some embodiments, soot reactor 52 may be optional. In some embodiments, an electrostatic filter may be used to remove particulates from gas stream 30, instead of soot reactor 52. In other embodiments, soot reactor 52 may be used in conjunction with, e.g., in series with, an electrostatic filter. Electrostatic filters for removing particulates are well known in the art.

Again with reference to FIG. 3A, WRAP system 40 may further include a primary heat exchanger or precooler 57 disposed downstream from soot reactor 52. Precooler 57 may serve to cool gas stream 30. In some embodiments, precooler 57 may comprise a catalytic heat exchanger, in which a catalytic coating may be applied to the hot-side passages of precooler 57, such that the catalytic coating oxidizes, and thus removes, vapor phase organics present in gas stream 30. A catalytic heat exchanger was described in commonly assigned, co-pending US Patent Application Publication No. US20030188850A1 entitled Tubular Catalytic Aircraft Precooler, the disclosure of which is incorporated by reference herein in its entirety.

WRAP system 40 may further include a secondary heat exchanger 59 disposed downstream from precooler 57. Secondary heat exchanger 59 may serve to further cool gas stream 30. Secondary heat exchanger 59 may be a recuperator, and may receive cold gas flow from water extractor 64.

WRAP system 40 may further include a condenser 62 disposed downstream from secondary heat exchanger 59. Condenser 62 may condense water present in gas stream 30. Condenser 62 may remove in the range of from about 75 to 85% of the total water present in gas stream 30.

Condenser 62 may be in thermal communication with a cooling unit 90 for providing a cooled fluid to condenser 62. The nature of cooling unit 90 may be to some extent a matter of design choice. As an example, cooling unit 90 may comprise at least one cooling system or apparatus such as a vapor cycle cooling system, an air cycle cooling system, a cooling tower system, or ambient air driven by a fan, such cooling systems being well known in the art. Cooling unit 90 may alternatively, or additionally, comprise either a sorptive cooling system or an absorbent cooling system. Absorbent cooling systems, which may use absorption of water to induce a water activity gradient, are known in the art. An example of a sorptive cooling system, which uses an adsorbent-induced water activity- or fugacity gradient to decrease water vapor pressure within an evaporation chamber or liquid/vapor reservoir 92, is described hereinbelow with reference to FIG. 4.

WRAP system 40 may further include a coalescing filter or water extractor 64 disposed downstream from condenser 62. Water extractor 64 may be adapted for separating condensed water from gas stream 30. Within water extractor 64, gas stream 30 containing condensed water droplets may undergo swirling action that creates a water-rich phase of gas stream 30 within water extractor 64, whereby disengagement of condensed water droplets from gas stream 30 by inertia is promoted. Water extractor 64 may incorporate high-surface area internal structure (not shown), such as grilles, louvers, or fins, which further promote coalescence of condensed water droplets and improve the efficiency of extracting liquid water or condensate from gas stream 30. Water extractor 64 may have an efficiency typically in the range of from about 75 to 90%, i.e., water extractor 64 may extract from about 75 to 90% of the total amount of water condensed in condenser 62. As an example, water extractor 64 may comprise a commercially available water separator available from Honeywell International Inc., Morristown, N.J.

WRAP system 40 may further include a water purification unit 70 adapted for receiving condensate from water extractor 64, and for purifying the condensate to provide potable water. In some embodiments, water purification unit 70 may comprise a reverse osmosis system 200 (see, for example, FIG. 6). WRAP system 40 may optionally further include a water filter (not shown), disposed upstream from reverse osmosis system 200, for removing particulates from the condensate.

WRAP system 40 may still further include a water storage unit 80 adapted for receiving and storing potable water provided from water purification unit 70. In some embodiments, water storage unit 80 may be in the form of an expandable and/or flexible storage container, which may shrink when empty and expand as it is filled with potable water from water purification unit 70.

An embodiment of WRAP system 40 as depicted in FIG. 3B may have a number of components in common with the embodiment described with reference to FIG. 3A. With reference to FIG. 3B, WRAP system 40 may additionally comprise a catalytic oxidation reactor (or CATOX) unit 54. A catalyst of CATOX unit 54 may comprise, for example, a noble metal, a transition metal, or a metal oxide on a suitable support such as a refractory oxide layer. A catalytic oxidation reactor or CATOX was described in commonly assigned, co-pending US Patent Application Publication No. US20030017090A1 entitled Environmental Control System Including Vapor Cycle System And Isothermal CATOX/PTF, the disclosure of which is incorporated by reference herein in its entirety.

CATOX unit 54 may catalytically oxidize carbon monoxide, as well as organic materials present in the vapor phase of gas stream 30. Such organic materials may comprise volatile organic compounds (VOCs), and semi-volatile organic compounds (SVOCs), including various hydrocarbons, xylene, benzene, toluene, etc., many of which are known toxins, carcinogens, and the like. Organic materials present in the vapor phase of gas stream 30 may further comprise pollutants which may be present in the local atmosphere at relatively high concentrations. Such organic materials may comprise warfare agents such as nerve gases used as chemical warfare agents, and smoke that has been used as an obscurant, e.g., in a battlefield environment. Pollutants present in the atmosphere, such as various organic materials, may be ingested by an engine, and may be present in engine exhaust gas 30' from which water is to be recovered by WRAP system 40.

CATOX unit 54 may catalytically oxidize or otherwise destroy at least 99% of organic vapor phase materials present in gas stream 30, including agents such as VX nerve gas. Typically, CATOX 54 may be disposed upstream from precooler 57. In some embodiments, as noted hereinabove, at least part of the function of CATOX 54 may be incorporated into precooler 57 to provide a catalytic primary heat exchanger. The remainder of the components shown in FIG. 3B may have characteristics essentially as described for the embodiment of FIG. 3A.

Another embodiment of a WRAP system 40 as depicted in FIG. 3C may have a number of components in common with the embodiments described with reference to FIGS. 3A-B. With reference to FIG. 3C, WRAP system 40 may additionally comprise a pair of adsorbent beds, namely, first adsorbent bed 56a and second adsorbent bed 56b. First and second adsorbent beds 56a 56b may be disposed downstream from precooler 57. Each of first and second adsorbent beds 56a 56b may comprise an adsorbent for the efficient removal of oxides of nitrogen (NOx) and oxides of sulfur (SOx).

First and second adsorbent beds 56a, 56b may be used in tandem in an alternative fashion, whereby one of first and second adsorbent beds 56a, 56b may be used in adsorption mode, while the other of first and second adsorbent beds 56a, 56b may be used in regeneration or desorption mode. In this manner, NOx and SOx removal from gas stream 30 can be performed continuously by first and second adsorbent beds 56a, 56b. Naturally, during desorption, first or second adsorbent bed 56a or 56b may be temporarily taken "off-line." Of course, more than two adsorbent beds may also be used. Adsorbents for removing NOx and SOx from a gas stream were described in commonly assigned, co-pending US Patent Application Publication No. US20010014302A1 entitled NOx Filter, the disclosure of which is incorporated by reference herein in its entirety.

Typically, adsorption of NOx and SOx on first and second adsorbent beds 56a, 56b may occur at a first, relatively low temperature, and desorption of NOx and SOx from first and second adsorbent beds 56a, 56b may occur at a second, higher temperature. Typically, the first temperature for adsorption may be in the range of from about 150 to 450° C., and usually from about 150 to 350° C. Typically, the second temperature for desorption may be in the range of from about 350 to 500° C., and usually from about 400 to 500° C. Heat for providing the second temperature for desorption may be provided by heat exchange with engine exhaust, or by other methods.

Desorption of NOx and SOx from first or second adsorbent bed 56a or 56b may be enhanced by passing therethrough a desorption gas, at an appropriate temperature, which is substantially devoid of NOx and SOx; and such desorption may be further enhanced if the desorption gas contains a reducing agent, e.g., hydrogen or carbon monoxide. NOx and SOx removed from first and second adsorbent beds 56a, 56b during desorption may be eliminated, e.g., by venting. The remainder of the components shown in FIG. 3B may function as described for the embodiment of FIG. 3A. Naturally, alternative embodiments of WRAP system 40, for example, in which two or more of soot reactor 52, CATOX unit 54, and first and second adsorbent bed 56a or 56b may be combined in various permutations, are also within the scope of the invention.

Figure 4:
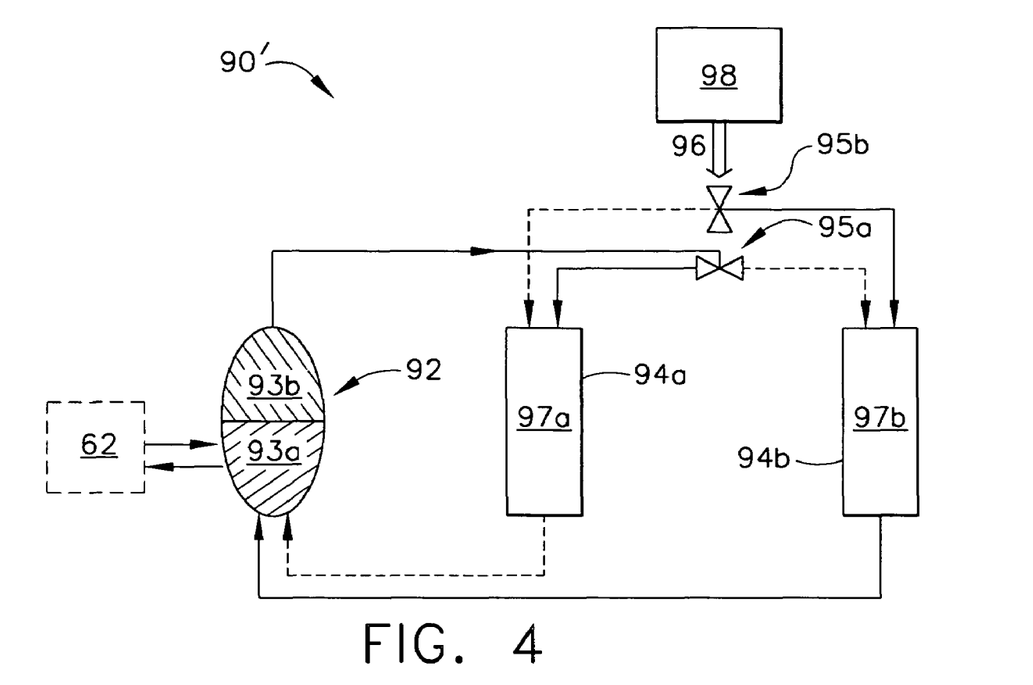
FIG. 4 shows a schematic representation of a sorptive cooling system in relation to a condenser, according to another embodiment of the invention.

FIG. 4 shows a schematic representation of a sorptive cooling system 90' in relation to a condenser 62, according to another embodiment of the invention. Sorptive cooling system 90' may comprise an evaporation chamber or liquid/vapor reservoir 92 for containing both a liquid 93a and a vapor 93b. As an example, liquid 93a may be liquid water and vapor 93b may be water vapor. Sorptive cooling system 90' may further comprise a first vapor adsorbing bed 94a containing a first vapor adsorbent 97a, and a second vapor adsorbing bed 94b containing a second vapor adsorbent 97b. As an example, first and second vapor adsorbents 97a, 97b may each comprise a zeolite (aluminosilicate) having an affinity for adsorbing water. First and second vapor adsorbing beds 94a, 94b may be used in alternative mode, wherein fluid communication between liquid/vapor reservoir 92 and either first vapor adsorbing bed 94a or second vapor adsorbing bed 94b is controlled by a first valve 95a.

As shown, liquid/vapor reservoir 92 may be in fluid communication with first vapor adsorbing bed 94a via first valve 95a, while second vapor adsorbing bed 94b may be in fluid communication via a second valve 95b with a supply of heated gas 96, which may be heated from a heat source 98. First vapor adsorbing bed 94a may adsorb vapor 93b from liquid/vapor reservoir 92. In the case where liquid/vapor reservoir 92 contains water, the water partial pressure gradient induced by adsorption of vapor 93b provides the motive force to drive vapor 93b from liquid/vapor reservoir 92 to first or second vapor adsorbing bed 94a, 94b. Adsorption of vapor 93b from liquid/vapor reservoir 92 decreases the pressure within liquid/vapor reservoir 92. The decrease in pressure within liquid/vapor reservoir 92 promotes vaporization of liquid 93a to vapor 93b, thereby cooling liquid 93a by loss of heat of vaporization. Cooled liquid 93a may be pumped from liquid/vapor reservoir 92 to condenser 62 and used as a cooling fluid by condenser 62. Liquid 93a may be circulated through a coil (not shown) housed within condenser 62, as is well known in the art.

As an example, while first vapor adsorbing bed 94a is being used to adsorb vapor 93b from liquid/vapor reservoir 92, second vapor adsorbing bed 94b may be regenerated by passing the supply of heated gas 96 therethrough, to effect desorption of vapor 93b from second vapor adsorbing bed 94b. Thereafter, second vapor adsorbing bed 94b may be placed in fluid communication with liquid/vapor reservoir 92 via first valve 95a, while first vapor adsorbing bed 94a may be placed in fluid communication with the supply of heated gas 96 via second valve 95b. In this manner, sorptive cooling system 90' may be used continuously to provide cooling fluid to condenser 62. Water desorbed from first and second vapor adsorbing beds 94a, 94b during regeneration may be recirculated to liquid/vapor reservoir 92. Sorptive cooling system 90' may be used in conjunction with condenser 62 in various embodiments of WRAP system 40.

Figure 5:
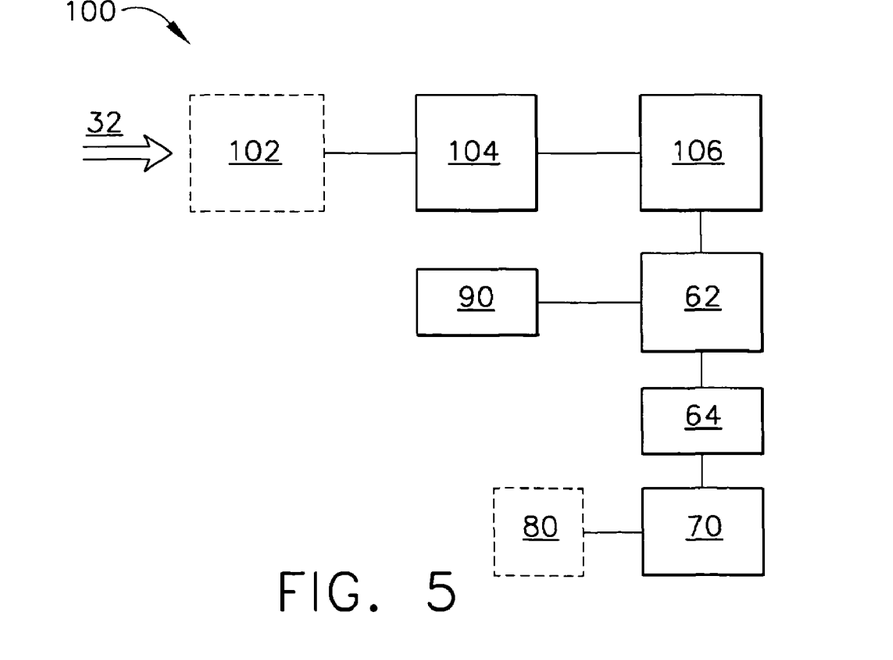
FIG. 5 schematically represents a system for water recovery and purification from air, according to another embodiment of the invention.

FIG. 5 schematically represents a system 100 for water recovery and purification from an airstream 32, according to another embodiment of the invention. System 100 may comprise an air intake unit 102 and an air filter 104 disposed downstream of air intake unit 102. By way of example, air intake unit 102 may be in the form of a duct on a building, or a scoop on a vehicle for receiving ram air during motion of the vehicle, either on land or in flight. Airstream 32 may be passed from air intake unit 102, through filter 104, and into condenser 62 via a fan 106. The nature of filter 104 may be selected according to the type and amount of pollutants, if any, present in airstream 32. Filter 104 may be, for example, a particulate filter, such as a HEPA filter. The remaining components of system 100 may have the same or similar structure, function, and characteristics as described hereinabove for WRAP system 40, for example, with reference to FIGS. 3A-C.

Figure 6:
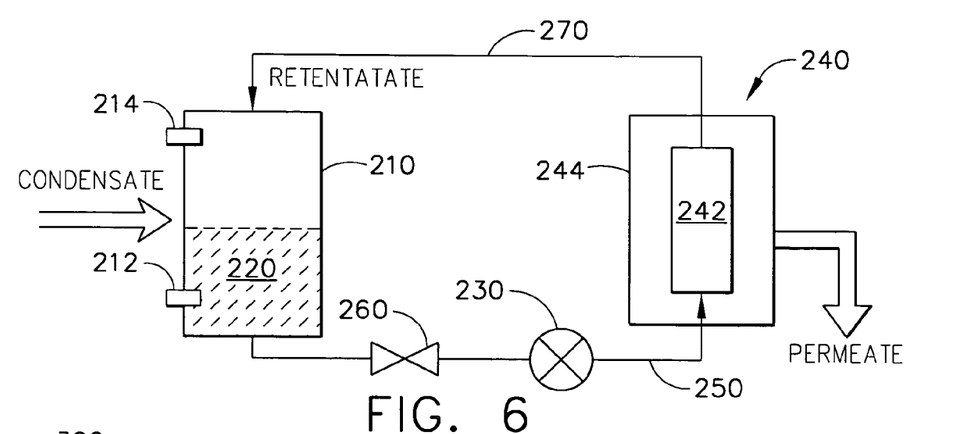
FIG. 6 is a schematic representation of a cyclic reverse osmosis system and process, according to another embodiment of the invention.

FIG. 6 is a schematic representation of a cyclic reverse osmosis system 200, according to another embodiment of the invention. Reverse osmosis system 200 may include a feed reservoir 210 for containing a feed water 220 and for receiving water or condensate to be purified by reverse osmosis. As an example, feed reservoir 210 may receive condensate from water separation unit 70, and more specifically from water extractor 74 (water separation unit 70 and water extractor 74 are not depicted in FIG. 6). System 200 may further include a feed pump 230, for pumping feed water 220 from feed reservoir 210 to reverse osmosis unit 240 via a first conduit 250.

System 200 may further include a discharge valve 260 for discharging feed water 220 from feed reservoir 210.

Reverse osmosis unit 240 may include a reverse osmosis membrane 242 housed within a reverse osmosis housing 244. Reverse osmosis membrane 242 may be of the type used in the art for purifying sea water or brackish water. Feed pump 230 may be a high pressure pump. Feed pump 230 may pump feed water 220 to reverse osmosis membrane 242, typically at a pressure in the range of from about 200 to 900 psi, usually from about 500 to 850 psi, and often from about 700 to 800 psi. Reverse osmosis membrane 242 may separate feed water 220 into a permeate and a retentate. The permeate may be collected from reverse osmosis unit 240 as potable water, which may be stored in a water storage unit 80 (see FIGS. 3A-C, FIG. 5). The retentate may be recycled to feed reservoir 210 via a second conduit 270.

Feed reservoir 210 may include a low water level 212 and a high water level 214. Typically, low water level 212 may correspond to a level in the range of from about 2 to 15% capacity of feed reservoir 210, usually from about 5 to 15%, and often about 10%. High water level 214 may correspond to a level in the range of from about 98 to 85% capacity of feed reservoir 210, usually from about 95 to 85%, and often about 90%.

Discharge valve 260 may be disposed downstream from feed reservoir 210 and upstream from feed pump 230. System 200 may further include a feed water level monitoring unit (not shown), in communication with discharge valve 260 and with feed pump 230, for determining when the level of feed water 220 attains low water level 212 or high water level 214. System 200 may still further include a total dissolved solids (TDS) monitoring unit (not shown), in communication with discharge valve 260, for determining when the TDS concentration of feed water 220 attains a pre-selected TDS concentration, at which time discharge valve 260 may be opened to discharge feed water 220 from feed reservoir 210. Discharged feed water (in the form of brine) may be collected in a suitable vessel and subsequently discarded. When the level of feed water 220 in feed reservoir 210 attains low water level 212, due to actuation of discharge valve 260 or for any other reason, feed pump 230 may be switched off. Conversely, when the level of feed water 220 in feed reservoir 210 attains high water level 214, feed pump 230 may be switched on. The size of feed reservoir 210 may be at least to some extent a matter of design choice. Exemplary flow rates within reverse osmosis system 200 are described hereinbelow with reference to FIG. 8.

Figure 7A:
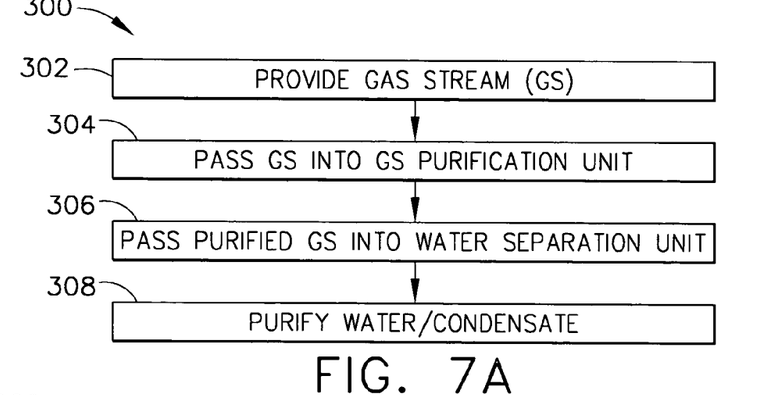
FIGS. 7A-B each schematically represents a series of steps involved in a method for recovering and purifying water from a gas stream, also according to the invention.

FIG. 7A schematically represents a series of steps involved in a method 300 for recovering and purifying water from a gas stream, according to another embodiment of the invention. Step 302 may involve providing a gas stream. The gas stream thus provided may be, for example, exhaust gas from an internal combustion engine, or ambient air.

Step 304 may involve passing the gas stream through a gas stream purification unit to provide a purified gas stream. In step 306 the purified gas stream, which may harbor trace quantities of pollutants, may be passed into a water separation unit for separating water from the purified gas stream. As an example, step 306 may involve extracting condensed water present in the gas stream using a water extractor to provide liquid water or a condensate. The liquid water or condensate thus obtained may contain trace quantities of pollutants or contaminants, such as VOCs, SVOCs, salts, and acids.

Step 308 may involve purifying the liquid water or condensate, using a water purifying unit, to provide potable water. Each of the gas stream purification unit, the water separation unit, and the water purifying unit may have elements and characteristics as described hereinabove, for example, with respect to FIGS. 2-6. The specific combination of elements or components of each of gas stream purification unit, the water separation unit, and the water purifying unit may be selected according to, for example, the nature of the gas stream and the quantity and quality of the water to be provided.

Figure 7B:
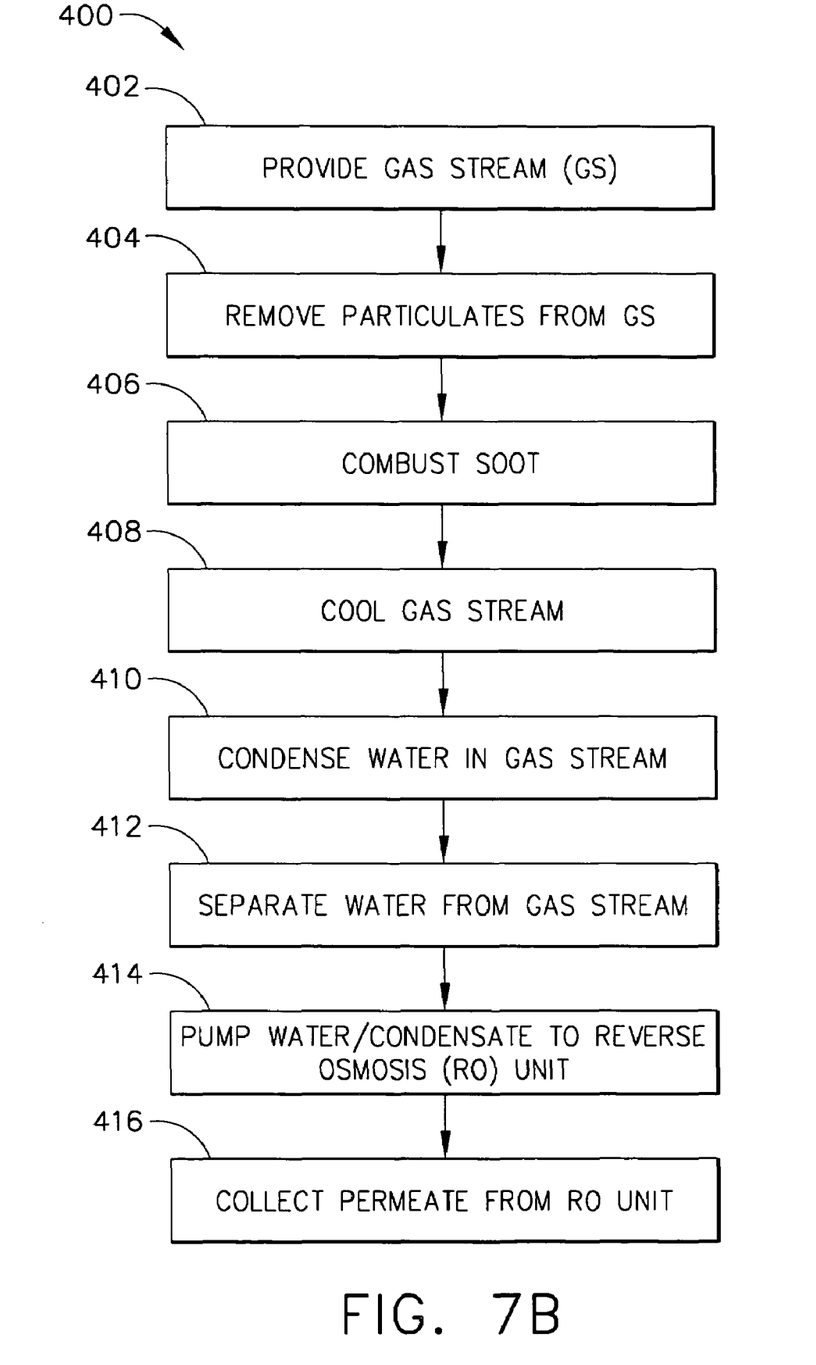

FIG. 7B schematically represents a series of steps involved in a method 400 for recovering and purifying water from a gas stream, according to another embodiment of the invention. Step 402 may involve providing a gas stream, essentially as described hereinabove. Step 404 may involve removing particulates from the gas stream. Step 404 may be achieved by passing the gas stream through a gas purification unit, as described with respect to FIGS. 2, 3A-C, and 5. For example, step 404 may involve passing the gas stream through a soot reactor. During step 404 organic particulate material, or soot, may be trapped on the soot reactor. Step 404 may further involve removing inorganic particulates, such as dust, from the gas stream. In embodiments where the gas stream comprises engine exhaust, step 404 may involve removing metals, e.g., metal fragments derived from engine components, from the gas stream.

Step 406 may involve combusting soot or organic particulates trapped on the soot reactor. Such combustion may be augmented by the presence of a catalyst on the soot reactor. Step 408 may involve cooling the gas stream after removal of particulates therefrom. Thereafter, step 410 may involve condensing water present in the gas stream.

Step 412 may involve separating or extracting water from the gas stream to provide liquid water or a condensate. Thereafter, the condensate may be pumped to a reverse osmosis unit in step 414, to provide a permeate fraction from the condensate. Thereafter, step 416 may involve collecting the permeate, which may comprise potable water, from the reverse osmosis unit. The permeate may be collected in a suitable storage unit or vessel which may be flexible and/or expandable.

Figure 8:
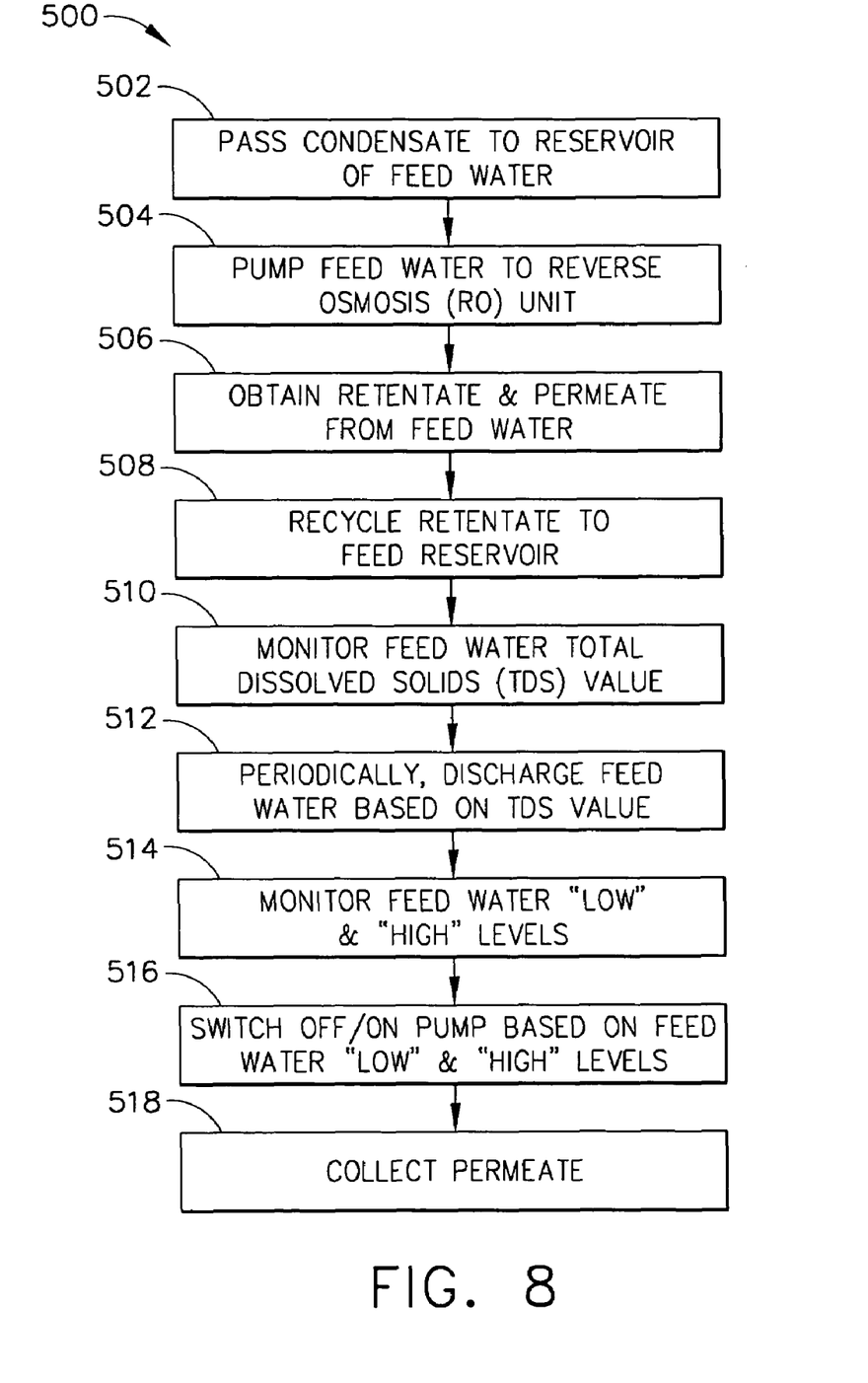
FIG. 8 schematically represents a series of steps involved in a method for purifying condensate from a gas stream via a cyclic reverse osmosis process, according to another embodiment of the invention.

FIG. 8 schematically represents a series of steps involved in a method 500 for purifying condensate obtained from a gas stream via a cyclic reverse osmosis process, according to another embodiment of the invention. Step 502 may involve passing condensate to a reservoir of feed water. The condensate passed to the feed reservoir may have a TDS concentration in the range of from about 1000 to 3000 mg/L, and usually from about 1500 to 2500 mg/L.

Step 504 may involve pumping the feed water, via a feed pump, from the feed reservoir to a reverse osmosis unit. The feed water may be fed to the reverse osmosis unit at a rate in the range of typically from about 1 to 50 gallons/minute (gpm), usually from about 2 to 20 gpm, and often from about 2 to 10 gpm. The feed water may be delivered to the reverse osmosis unit at a pressure in the range of typically from about 200 to 900 psi, usually from about 500 to 850 psi, and often from about 700 to 800 psi. The reverse osmosis unit may comprise a reverse osmosis membrane. Various types of reverse osmosis membranes are known in the art. A reverse osmosis membrane of the type used in the art for purifying seawater or brackish water may be used in conjunction with method 500. Solutes, such as inorganic salts and mineral acids, present in the feed water will not pass through the reverse osmosis membrane. As a result, water that permeates the membrane, known as permeate, is free from such impurities. The fraction of the feed water that is retained by the reverse osmosis membrane is known as retentate. Step 506 may involve separating the feed water, via the reverse osmosis unit, to obtain retentate and permeate. Step 508 may involve recycling the retentate to the feed reservoir. Step 510 may involve monitoring the concentration of TDS in the feed water contained within the feed reservoir.

Step 512 may involve discharging the feed water from the feed reservoir when the TDS concentration attains a pre-set or pre-selected concentration. The pre-selected TDS concentration may be in the range of from about 5,000 to 30,000 mg/L, usually from about 15,000 to 25,000 mg/L, and often from about 18,000 to 25,000 mg/L. Step 512 may involve discharging essentially all of the feed water from the feed reservoir.

Step 514 may involve monitoring a low water level and a high water level of feed water in the feed reservoir. Step 516 may involve switching off the feed pump when the low water level of feed water is attained. Step 516 may further involve switching on the feed pump when the high water level of feed water is attained. Step 518 may involve collecting the permeate separated from feed water in step 506. The permeate may be collected at a rate typically in the range of from about 1 to 60 gallons/hour, usually from about 3 to 40 gallons/hour, and often from about 5 to 20 gallons/hour.

Figure 9:
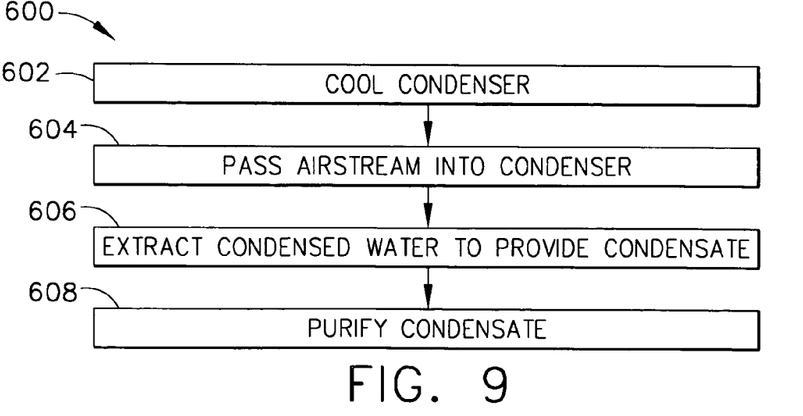
FIG. 9 schematically represents a series of steps involved in a method for recovering and purifying condensate from an airstream, according to another embodiment of the invention.

FIG. 9 schematically represents a series of steps involved in a method 600 for recovering and purifying condensate from an airstream to provide potable water, according to another embodiment of the invention. Step 602 of method 600 may involve cooling a condenser via a cooled fluid provided from a cooling unit. The cooling unit may comprise at least one apparatus or system, such as a vapor cycle system, an air cycle system, an ambient air cooling system, a cooling tower system, a sorptive cooling system, or an absorption cooling system.

Step 604 may involve passing an airstream into the condenser, such that water present in the airstream is condensed. Prior to step 604, the airstream may optionally be passed through a gas stream purification unit. The nature of the gas stream purification unit may vary according to the purity level of the airstream and the quality of water to be provided by method 600. Gas stream purification units having various components for removal of certain pollutants are described hereinabove, for example, with reference to FIGS. 3 and 3A-C. The gas stream purification unit may typically include at least one particulate filter. Step 606 may involve extracting the condensed water from the airstream to provide liquid water or a condensate. Thereafter, step 608 may involve purifying the condensate to provide potable water.

EXAMPLE

A Cyclic Reverse Osmosis Process for Water Recovery and Purification from Exhaust Gas Exhaust gas from a gas turbine engine or a diesel engine of an armored land vehicle was passed through a gas stream purification unit including a soot reactor to provide a cleaned gas stream. Water was separated from the cleaned gas stream via a water extractor and passed to a 5 gallon feed reservoir at a rate of about 50 gallons per day (or an average flow rate of about 0.035 gallons/minute (gpm)). Condensate passed to the feed reservoir had a TDS concentration of about 2000 mg/L. A reverse osmosis membrane was fed from the feed reservoir at a rate of about 5 gallons/minute and at a pressure of about 800 psi. The retentate was recycled back to the feed reservoir at a rate of about 4.9 gpm. The rate of permeate flow across the reverse osmosis membrane was about 0.1 gpm, or about 21.8 L/hour.

It should be understood, of course, that the foregoing relates to exemplary embodiments of the invention and that modifications may be made without departing from the spirit and scope of the invention as set forth in the following claims.

We claim:

1. A method for providing potable water from a gas, comprising:
   a) providing a gas stream;
   b) passing said gas stream through a gas stream purification unit to trap and combust organic particulates and provide a purified gas stream;
   c) passing said purified gas stream into a water separation unit to separate water from said purified gas stream; and
   d) purifying said water via a reverse osmosis unit.

2. The method of claim 1, wherein said gas stream comprises air or engine exhaust gas.

3. A method for providing potable water, comprising:
   a) providing a gas stream;
   b) passing said gas stream through a gas stream purification unit to provide a purified gas stream wherein said step b) comprises passing said gas stream through a soot reactor to trap and combust particulates;
   c) passing said purified gas stream into a water separation unit to separate water from said purified gas stream; and
   d) purifying said water;
   wherein said water separation unit comprises:
      a condenser, a cooling unit in communication with said condenser for providing a cooled fluid to said condenser, and
      a water extractor for separating condensed water from said gas stream, wherein said cooling unit comprises at least one apparatus selected from the group consisting of a vapor cycle system, an air cycle system, an ambient air cooling system, a cooling tower system, a sorptive cooling system, and an absorption cooling system.

4. A method for recovering potable water from a gas stream, comprising,
   a) providing a gas stream;
   b) via a soot reactor, removing particulates from said gas stream;
   c) combusting organic particulates trapped by said soot reactor in said step b);
   d) cooling said gas stream via passage through a precooler disposed downstream from said soot reactor;
   e) condensing water in said gas stream;
   f) via a water extractor, separating said water from said gas stream;
   g) pumping said water to a reverse osmosis unit; and
   h) collecting a permeate from said reverse osmosis unit, wherein said permeate comprises potable water.

5. The method of claim 4, wherein said step g) comprises pumping feed water from a feed reservoir to said reverse osmosis unit, and the method further comprises:
   i) recycling a retentate from said reverse osmosis unit to said feed reservoir.

6. The method of claim 5, further comprising:
   j) monitoring a concentration of total dissolved solids of said feed water in said feed reservoir;
   k) repeating said steps g)-i) until a pre-selected total dissolved solids concentration is attained; and
   l) after said step j), discharging said feed water from said feed reservoir.

7. A method for purifying water, comprising:
   a) passing condensate to a feed reservoir containing feed water, wherein said condensate is obtained from a gas stream;
   b) pumping said feed water from said feed reservoir, via a first conduit, to a reverse osmosis unit;
   c) via said reverse osmosis unit, separating said feed water into a retentate and a permeate;

d) recycling said retentate to said feed reservoir via a second conduit;
e) collecting said permeate;
f) monitoring a concentration of total dissolved solids of said feed water in said feed reservoir; and
g) when said concentration of total dissolved solids of said feed water reaches a pre-selected total dissolved solids concentration, discharging said feed water from said feed reservoir.

8. The method of claim 7, wherein discharging said feed water in said step g) is accomplished by opening a solenoid valve.

9. The method of claim 7, wherein said pre-selected total dissolved solids concentration is from about 15,000 to 25,000 mg/L.

10. The method of claim 7, wherein said step b) comprises pumping said feed water at a pressure in the range of from about 200 to 850 psi.

11. The method of claim 7, wherein said step b) comprises pumping said feed water at a pressure in the range of from about 500 to 850 psi.

12. The method of claim 7, wherein said step b) is performed at a rate of from about 2 to 10 gallons per minute.

13. The method of claim 7, wherein said step e) is performed at a rate of from about 5 to 20 gallons per hour.

14. The method of claim 7, wherein said gas stream is a stream of ambient air or a stream of exhaust gas from an internal combustion engine.

15. The method of claim 7, wherein said step b) is performed by a feed pump, and the method further comprises:
h) monitoring both a low water level and a high water level of said feed water in said feed reservoir; and
i) when said low water level of said feed water is attained, switching off said feed pump, whereby pumping said feed water from said feed reservoir is discontinued.

16. The method of claim 15, further comprising:
j) while continuing said step a), when said high water level of said feed water is attained, switching on said feed pump, whereby pumping said feed water from said feed reservoir is continued.

17. A method for recovering water from air, comprising:
a) cooling a condenser via a cooled fluid;
b) passing an airstream into said condenser, whereby water in said airstream is condensed;
c) extracting said condensed water via a water extractor to provide a condensate;
d) purifying said condensate by passing said condensate through at least one of a water filter and a reverse osmosis unit; and
wherein the step a) is performed only with cooled fluid provided from a sorptive cooling unit.

18. The method of claim 17, wherein said step d) comprises:
e) collecting said condensate in a feed reservoir containing feed water;
f) pumping said feed water from said feed reservoir to said reverse osmosis unit;
g) via said reverse osmosis unit, separating said condensate into a retentate and a permeate;
h) recycling said retentate to said feed reservoir; and
i) collecting said permeate, wherein said permeate comprises potable water.

19. A system, comprising:
a gas stream purification unit for purifying a gas stream to provide a purified gas stream wherein said gas stream purification unit comprises a reactor to trap and combust non-volatile organic materials;
a water separation unit for separating condensed water from said purified gas stream to provide a condensate, said water separation unit disposed downstream from said gas stream purification unit; and
a water purification unit for purifying said water, wherein said water purification unit comprises a reverse osmosis system.

20. The system of claim 19, wherein said water separation unit comprises a water extractor.

21. The system of claim 19, wherein said water seperation unit comprises a condenser and a cooling unit for providing a cooled fluid to said condenser, wherein said cooling unit comprises at least one apparatus selected from the group consisting of a vapor cycle system, an air cycle system, an ambient air cooling system, a cooling tower system, a sorptive cooling system, and an absorption cooling system.

22. The system of claim 19, wherein said reverse osmosis system comprises:
a feed reservoir for holding feed water, said feed reservoir adapted for receiving said condensate;
a reverse osmosis unit for providing a permeate and a retentate from said feed water;
a pump in fluid communication, via a first conduit, with said feed reservoir and said reverse osmosis unit, said pump for pumping said feed water from said feed reservoir to said reverse osmosis unit; and
a second conduit coupled between said reverse osmosis unit and said feed reservoir for recycling said retentate from said reverse osmosis unit to said feed reservoir.

23. The system of claim 22, further comprising a solenoid valve adapted for controlling discharge of said feed water from said feed reservoir, said solenoid valve responsive to a pre-selected total dissolved solids concentration of said feed water in said feed reservoir.

24. A system, comprising:
a gas stream purification unit for purifying a gas stream to provide a purified gas stream;
a water separation unit for separating water from said purified gas stream, said water separation unit disposed downstream from said gas stream purification unit; and
a water purification unit for purifying said water, wherein:
said gas stream purification unit comprises a soot reactor for removing particulates from said gas stream, and
said soot reactor is adapted for oxidizing organic particulates removed from said gas stream to carbon dioxide.

25. The system of claim 24, wherein said gas stream purification unit further comprises a CATOX unit disposed upstream from said water separation unit.

26. The system of claim 24, wherein said water separation unit comprises a water extractor.

27. The system of claim 26, wherein said water purification unit comprises at least one of a reverse osmosis system and a water filter.

28. A system, comprising:
a gas stream purification unit for trapping and combusting non-volatile particulates in a gas stream to provide a purified gas stream;
a water separation unit for separating water from said purified gas stream; and
a water purification unit for purifying said water, wherein:
said water separation unit disposed downstream from said gas stream purification unit,
said water separation unit including a condenser and a cooling unit for providing a cooled fluid to said condenser, and
said cooling unit comprises at least one apparatus selected from the group consisting of a vapor cycle system, an air cycle system, an ambient air cooling system, a cooling tower system, a sorptive cooling system, and an absorption cooling system.

29. The system of claim 28, wherein said cooling unit is a sorptive cooling system, and said water purification unit comprises a reverse osmosis unit.

30. A system for recovering water from air, comprising:
a filter for filtering an airstream;
a soot reactor for removing organic particulates from said airstream and for combusting the organic particulates;
a condenser for condensing water in said airstream;
a cooling unit in thermal communication with said condenser for providing a cooled fluid to said condenser;
a water extractor for separating said water condensed in said condenser; and
a water purification unit for purifying said water separated by said water extractor.

31. The system of claim 30, wherein said airstream comprises ambient air.

32. The system of claim 30, wherein said water purification unit comprises a reverse osmosis unit.

33. The system of claim 30, wherein said cooling unit comprises a sorptive cooling system.

34. The system of claim 33, wherein said sorptive cooling system comprises:
a liquid/vapor reservoir;
a first adsorbent in a first vapor adsorbing bed; and
a second adsorbent in a second vapor adsorbing bed, wherein:
said liquid/vapor reservoir contains water, and
each of said first adsorbent and said second adsorbent comprises a zeolite.

35. A system, comprising,
a gas stream source for providing a gas stream;
a soot reactor for removing particulates from said gas stream and for combusting organic particulates;
a CATOX unit adapted for catalytically oxidizing organic components of said gas stream, said CATOX unit disposed downstream from said soot reactor;
a precooler disposed downstream from said soot reactor;
a condenser for condensing water in said gas stream;
a water extractor for separating said water from said gas stream; and
a reverse osmosis system for purifying said water separated by said water extractor.

36. The system of claim 35, further comprising: at least two adsorbent beds disposed downstream from said precooler, wherein each of said adsorbent beds is adapted for adsorbing inorganic gases from said gas stream.

37. The system of claim 35, wherein said CATOX unit is integral with said precooler such that said precooler comprises a catalytic heat exchanger.

38. The system of claim 35, further comprising:
a recuperator disposed downstream from said precooler and upstream from said condenser.

* * * * *